(12) United States Patent
Hood et al.

(10) Patent No.: US 8,127,035 B1
(45) Date of Patent: *Feb. 28, 2012

(54) DISTRIBUTED MESSAGE ENGINES AND SYSTEMS

(75) Inventors: Gavan W. Hood, Upper Lockyer (AU); Michael D. Kalan, Highland Heights, OH (US); Sujeet Chand, Brookfield, WI (US); Paul R. D'Mura, Glendale, AZ (US); Kenwood H. Hall, Hudson, OH (US); Kenneth S. Plache, Scottsdale, AZ (US); Clifton H. Bromley, New Westminster (CA)

(73) Assignee: Rockwell Automation Technologies, Inc., Mayfield Hts., OH (US)

( * ) Notice: Subject to any disclaimer, the term of this patent is extended or adjusted under 35 U.S.C. 154(b) by 1498 days.

This patent is subject to a terminal disclaimer.

(21) Appl. No.: 11/536,338

(22) Filed: Sep. 28, 2006

(51) Int. Cl.
*G06F 15/16* (2006.01)
*G05B 15/00* (2006.01)

(52) U.S. Cl. ......................................... 709/230; 709/227

(58) Field of Classification Search .................. 709/206, 709/227, 228, 230; 700/1
See application file for complete search history.

(56) References Cited

U.S. PATENT DOCUMENTS

| | | | |
|---|---|---|---|
| 5,524,253 A | 6/1996 | Pham et al. | |
| 5,548,756 A | 8/1996 | Tantry et al. | |
| 5,812,394 A | 9/1998 | Lewis et al. | |
| 5,961,595 A | 10/1999 | Kawagoe et al. | |
| 6,034,970 A * | 3/2000 | Levac et al. | 370/466 |
| 6,820,249 B1 * | 11/2004 | Jachmann et al. | 717/108 |
| 6,868,538 B1 | 3/2005 | Nixon et al. | |
| 7,043,311 B2 | 5/2006 | Nixon et al. | |
| 7,058,712 B1 | 6/2006 | Vasko et al. | |
| 7,086,009 B2 | 8/2006 | Resnick et al. | |
| 7,089,530 B1 | 8/2006 | Dardinski et al. | |
| 7,096,465 B1 | 8/2006 | Dardinski et al. | |
| 7,580,423 B2 * | 8/2009 | Anantha-Raju et al. | 370/466 |
| 7,730,022 B2 | 6/2010 | Laub et al. | |
| 2002/0163520 A1 | 11/2002 | Hardin et al. | |
| 2002/0174262 A1 | 11/2002 | Marcos et al. | |
| 2003/0051053 A1 | 3/2003 | Vasko et al. | |
| 2003/0236576 A1 * | 12/2003 | Resnick et al. | 700/9 |
| 2004/0006401 A1 * | 1/2004 | Yamada et al. | 700/83 |
| 2004/0158842 A1 * | 8/2004 | Gilfix et al. | 719/328 |
| 2005/0007249 A1 | 1/2005 | Eryurek et al. | |

(Continued)

FOREIGN PATENT DOCUMENTS

DE 20016625 U1 12/2000

(Continued)

OTHER PUBLICATIONS

"Foundation Fieldbus Technical Overview", FD-043 Revision 3.0, 2003, Fieldbus Foundation.*

(Continued)

*Primary Examiner* — Brian J Gillis
(74) *Attorney, Agent, or Firm* — Turocy & Watson, LLP

(57) ABSTRACT

Systems and methods that facilitate messaging capabilities within a unified plant model (UPM) via employing a plurality of message engines that collaborate in such system. Linkage can be provided among the plurality of message engines, to provide real time interaction among the message engines/services, wherein each message engine normalizes messaging of various messaging protocols and formats. Also various systems of the UPM can map thereto—and provide a consistent interface where events are sent/received consistently across the system.

31 Claims, 14 Drawing Sheets

U.S. PATENT DOCUMENTS

| | | | |
|---|---|---|---|
| 2006/0026672 A1 | | 2/2006 | Braun |
| 2006/0122812 A1 | | 6/2006 | Tinseth |
| 2006/0149767 A1 | | 7/2006 | Kindsvogel et al. |
| 2006/0155578 A1 | * | 7/2006 | Eisenberger et al. ............. 705/2 |
| 2006/0271939 A1 | * | 11/2006 | Joris et al. .................... 719/313 |
| 2008/0034415 A1 | | 2/2008 | Chacko et al. |

FOREIGN PATENT DOCUMENTS

| | | | |
|---|---|---|---|
| EP | 0456249 | A2 | 11/1991 |
| EP | 1420316 | A1 | 5/2004 |
| EP | 1672872 | A1 | 6/2006 |
| EP | 1696376 | A | 8/2006 |
| EP | 1696376 | A2 * | 8/2006 |
| WO | 03001334 | A2 | 1/2003 |

OTHER PUBLICATIONS

Cheah, et al. Institute of Electrical and Electronics Engineers: "Implementing Manufacturing Message Specification services and protocol using ISO Development Environment". Oct. 19, 1993. pp. 553-556.

European Search Report for European Patent Application No. EP07117409 dated Jan. 24, 2008, 8 pages.

European Search Report dated Feb. 7, 2008 for European Patent Application Serial No. EP 07 11 7361, 1 page.

OA mailed May 19, 2009 for U.S. Appl. No. 11/536,411, 31 pages.

Herrick J. Johnson, "Each piece in its place" Unix Review, San Francisco, CA, US, vol. 5, No. 5, Jun. 1, 1987, pp. 66-75.

European Search Report dated Apr. 27, 2009 for European Patent Application Serial No. 07117357, 2 Pages.

OA dated Jun. 10, 2010 for U.S. Appl. No. 11/536,411, 36 pages.

OA dated Nov. 10, 2010 for U.S. Appl. No. 11536395, 39 pages.

Final OA mailed Oct. 23, 2009 for U.S. Appl. No. 11/536,411, 26 pages.

OA mailed Feb. 2, 2011 for U.S. Appl. No. 11/536,269, 45 pages.

A. S. Tanenbaum: "Computer Networks" 2003, Pearson Education, US. pp. 869-891.

A. S. Tanenbaum: "Structured Computer Organization" 1999, Prentice-Hall, US. pp. 653-669.

Final OA dated Apr. 27, 2011 for US Appl. No. 11/536,395, 38 pages.

Non-Final OA dated Jun. 23, 2011 for U.S. Appl. No. 11/536,411, 44 pages.

Final OA dated Jun. 18, 2011 for U.S. Appl. No. 11/536,269, 38 pages.

* cited by examiner

DISTRIBUTED MESSAGE ENGINES AND SYSTEMS

CROSS REFERENCE TO RELATED APPLICATIONS

The subject application relates to co-pending applications filed on Sep. 28, 2006 Ser. No. 11/536,395 entitled "Message Engine"; Ser. No. 11/536,269 entitled "Messaging Configuration System; Ser. No. 11/536,411 entitled "Message Engine Searching and Classification", the disclosures of which are hereby incorporated by reference as if fully set forth herein.

TECHNICAL FIELD

The subject invention relates to industrial control systems and, more particularly, to systems and methods that facilitate reliable messaging with and/or within an industrial environment.

BACKGROUND OF THE INVENTION

Electronic commerce, or e-commerce, generally refers to business conducted over an electronic medium such as the Internet (e.g., through the World Wide Web, or Web). Electronic commerce transactions typically are facilitated through applications such as web services, electronic shopping carts, file transfer protocol (FTP), secure FTP, electronic data interchange (EDI), email, and Universal Description, Discovery, and Integration (UDDI), among others. Electronic commerce transactions commonly are differentiated based on the type of trading partners that are interacting. For example, commerce between a business and a consumer generally is referred to as business-to-consumer (B2C) commerce, whereas commerce between businesses generally is referred to as business-to-business (B2B) commerce. Integration servers can be utilized to couple business and/or consumer trading partners and coordinate communication therebetween. By way of example, two businesses that employ disparate operating systems and/or applications can utilize an integration server to interact across internal and external networked computer systems.

In many instances, e-commerce can leverage information obtained from control systems or affect control systems. For example, a consumer purchasing an automobile through a dealer's web site may desire to know the lead time associated with building an automobile with a customized set of options. The dealer may query its manufacturing plants to ascertain whether an automobile with those options has been built or is going to be built. The result along with additional information can facilitate determining when such automobile will arrive at the distributor. If the purchaser decides to place a custom order (e.g., where there is no plan to build a car with the desired combination of options), the custom specification can be provided to the manufacturing plant and employed to automatically configure one or more control systems therein. For example, the customer may have specified the color green as the external color of the automobile. This data can be conveyed to a control system and utilized to automatically select a suitable paint gun (e.g., a paint gun associated with green paint) or green paint when the automobile is being assembled.

Control systems commonly employ one or more industrial controllers. A typical industrial controller is a special purpose processing device for controlling (e.g., via an automated and a semi-automated means) industrial processes, machines, manufacturing equipment, plants, and the like. Such controllers can execute a control program or routine in order to measure one or more process variables or inputs representative of a status of a controlled process and/or effectuate outputs associated with control of the process. For example, an output module can interface directly with a controlled process by providing an output from memory to an actuator such as a motor, drive, valve, solenoid, and the like. In distributed control systems, controller hardware configuration can be facilitated by separating the industrial controller into a number of control elements, each of which can perform a different function. Particular control modules needed for the control task can be connected together on a common backplane within a rack and/or through a network or other communications medium.

Various control modules can also be spatially distributed along a common communication link in several locations. Data can be communicated with these remote modules over a common communication link, or network, wherein any or all modules on the network communicate via a common and/or an industrial communications protocol. Controllers within a control system can communicate with each other, with controllers residing in other control systems or with systems or applications outside of a control environment (e.g., business related systems and applications).

Accordingly, information management such as message exchange using different protocols and configurations is becoming complex. For example, the mapping of information from production management to process control and custom glue code for integrating systems with different protocols and formats make configuration and management a difficult task. Moreover, failed communications (e.g., messages that are not received or acted upon), delayed responses (e.g., as a function of the time difference between a sent message and a re-send), and additional overhead (e.g., consumption of processing cycles to review stored notifications, schedule re-transmissions and re-send messages) further add to the problems involved.

SUMMARY

The following presents a simplified summary of the subject innovation in order to provide a basic understanding of some aspects described herein. This summary is not an extensive overview, and is not intended to identify key/critical elements or to delineate the scope of the claimed subject matter. Its sole purpose is to present some concepts in a simplified form as a prelude to the more detailed description that is presented later.

The subject innovation provides systems and methods that facilitate messaging capabilities within a unified plant model (UPM) via employing a plurality of message engines that collaborate in such system. Linkages are supplied among the plurality of message engines, to provide real time interaction among the message engines/services, wherein each message engine normalizes messaging of various messaging protocols and formats. Also various systems of the UPM can map thereto—and provide a consistent interface where events are sent/received consistently across the system.

According to a further aspect, a message bus can be constructed with multiple message engines (services) that can communicate via preferred channels to other services/products, and via open standards based interfaces to third party products. Connections between the message engines can be further optimized with an information level messaging protocol that meet needs of customers that employ the subject innovation. For example, third party external systems can map into a canonical model associated with the services.

Moreover, a message engine(s) that acts as a building block of the bus can supply real time exchange of instant messaging among modules/applications. Accordingly, such messaging engines can facilitate communication (e.g., via preferred channels) to other services/products, wherein the configuration and management of messaging is consistent across the system. In a related aspect the message engine can supply a common configuration of quality (e.g., events, command, event, alarm, scenarios, transactions and messages) and provide support for a reference and self-describing messaging (in addition to non-self describing messaging). Moreover, the Message engine(s) can leverage directory and other UPM services to locate other message engines and their configurations as well as supported messages. Such information can further reduce the glue code in configuring and managing the system as message engines can determine the appropriate mapping and routing of messages through the system. In addition, a common view to system information (e.g., for proprietary and third party legacy) with additional perspective(s) of messaging system can be provided. The message engine(s) activities can include: Filtering, Bridging, Routing, Propagation, Transformation/Monitoring of messages and events in a customer's manufacturing system, for example. Also support can be provided for routing, data conversion, aggregation, and the like (e.g., third party and legacy systems can be integrated with public standards based interfaces.) Such a system can enable a cohesive assembly of manufacturing system to enable incremental integration of devices to the manufacturing system.

Moreover, data mapping can be facilitated and higher level information interfaces (as compared to raw data interfaces) can be implemented. Additionally, a messaging system can be configured, deployed and managed based on quality of service metrics (e.g., data volume, turn around time, latency, redundancy, reliability and the like) from a common administration environment. Also messaging information can be presented in context with user scenario across the manufacturing system. For example, such UPM messaging infrastructure can support interfaces to proprietary interfaces and other third party products, to enable customers to manage heterogeneous environments that typically exist in plants. The core messaging infrastructure and interfaces to third party systems can be consistent across control, manufacturing execution system (MES) and enterprise resource planning (ERP) systems, thus minimizing complexity of configuration and management to customers.

To the accomplishment of the foregoing and related ends, certain illustrative aspects of the claimed subject matter are described herein in connection with the following description and the annexed drawings. These aspects are indicative, however, of but a few of the various ways in which the principles of the claimed subject matter can be employed and such subject matter is intended to include all such aspects and their equivalents. Other advantages and novel features will become apparent from the following detailed description of the invention when considered in conjunction with the drawings.

DETAILED DESCRIPTION

Figure 1:
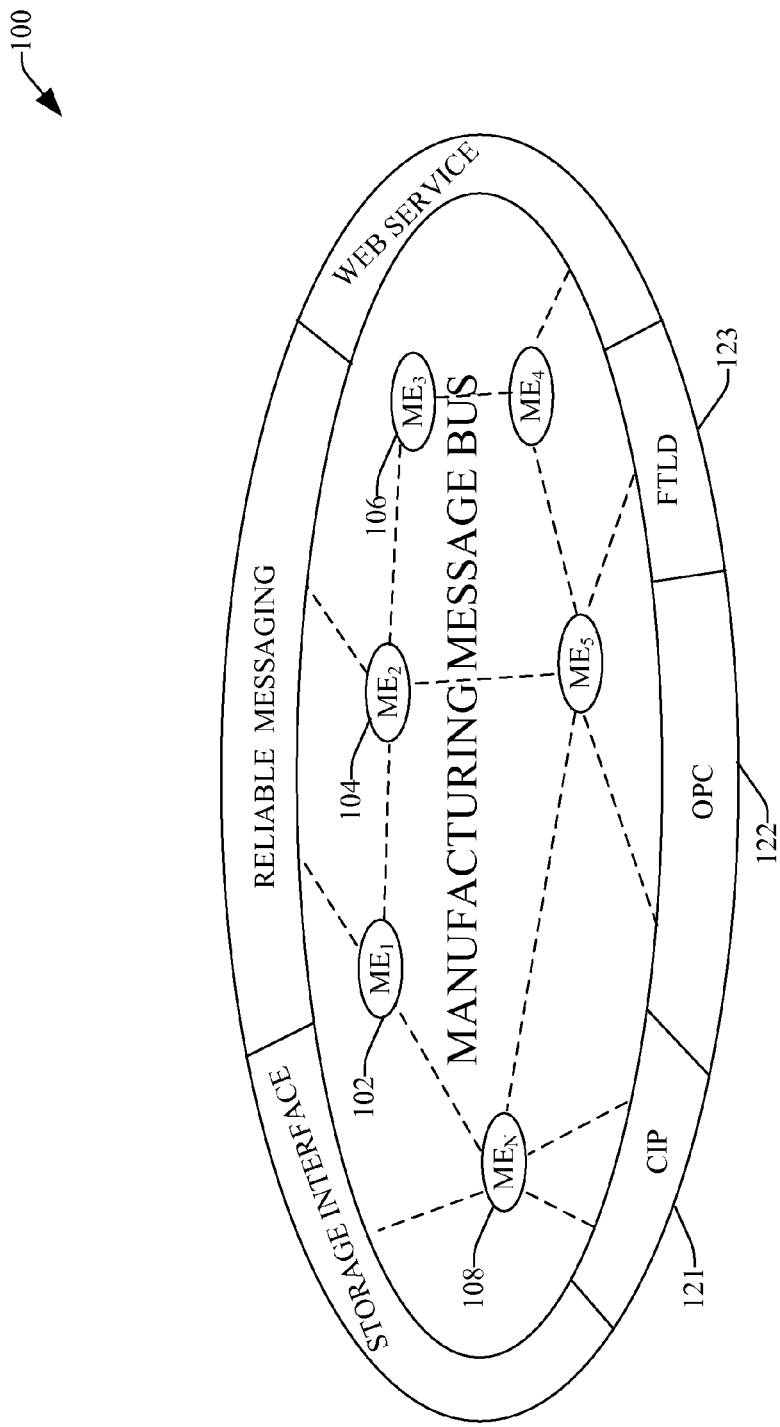
FIG. 1 illustrates a message exchange system with service interfaces to Unified Plant Model (UPM) message engines/manufacturing message bus in accordance with an aspect of the subject innovation.

The subject innovation is now described with reference to the drawings, wherein like reference numerals are used to refer to like elements throughout. In the following description, for purposes of explanation, numerous specific details are set forth in order to provide a thorough understanding of the claimed subject matter. It may be evident, however, that such matter can be practiced without these specific details. In other instances, well-known structures and devices are shown in block diagram form in order to facilitate describing the invention.

FIG. 1 illustrates a message exchange system 100 with service interfaces to Unified Plant Model (UPM) message engines/manufacturing message bus in accordance with an aspect of the subject innovation. The message exchange system 100 can be constructed with multiple message engines (services) that communicate via preferred channels to other services or products, and via open standards based interfaces to third party products. Connections between the message engines 102, 104, 106, 108 (1 to n, where n is an integer) can be further optimized with an information level messaging protocol that meet needs of customers that employ the subject innovation.

Applications 121, 122, 123 (OPC-OLE interfaces that expose data from a variety of sources for process control; Control & Information Protocol—CIP, Factory Talk Live Data) can interact with other applications via message constructs or services, as described in detail infra that send and receive messages. Such message bus interactions can be aggregated into a plurality of scenarios. The message exchange services can provide a higher level interface to the message level interfaces allowing abstraction of applications from messages and conversely messages from applications. The manufacturing message bus supports a both message and service interfaces. Applications 121, 122, 123 can send and receive messages in different contexts; services allow applications to associate message processing functionality with messages in service operations.

In the message exchange system 100, messaging elements (Alarm messages, Command messages, Data replication, Event messages, Scenarios, and the like) can be configured in libraries and deployed to production systems, such deployment process can be consistent with a UPM library and deployment model. Accordingly, value of UPM messaging and scenarios can be extended by the delivery of predefined messages, services and message scenarios that are implemented by products related to the message exchange 100, and which can be leveraged by end users. End users can also define their own messages and message scenarios and deploy the library components using the common UPM deployment and versioning models.

Figure 2:
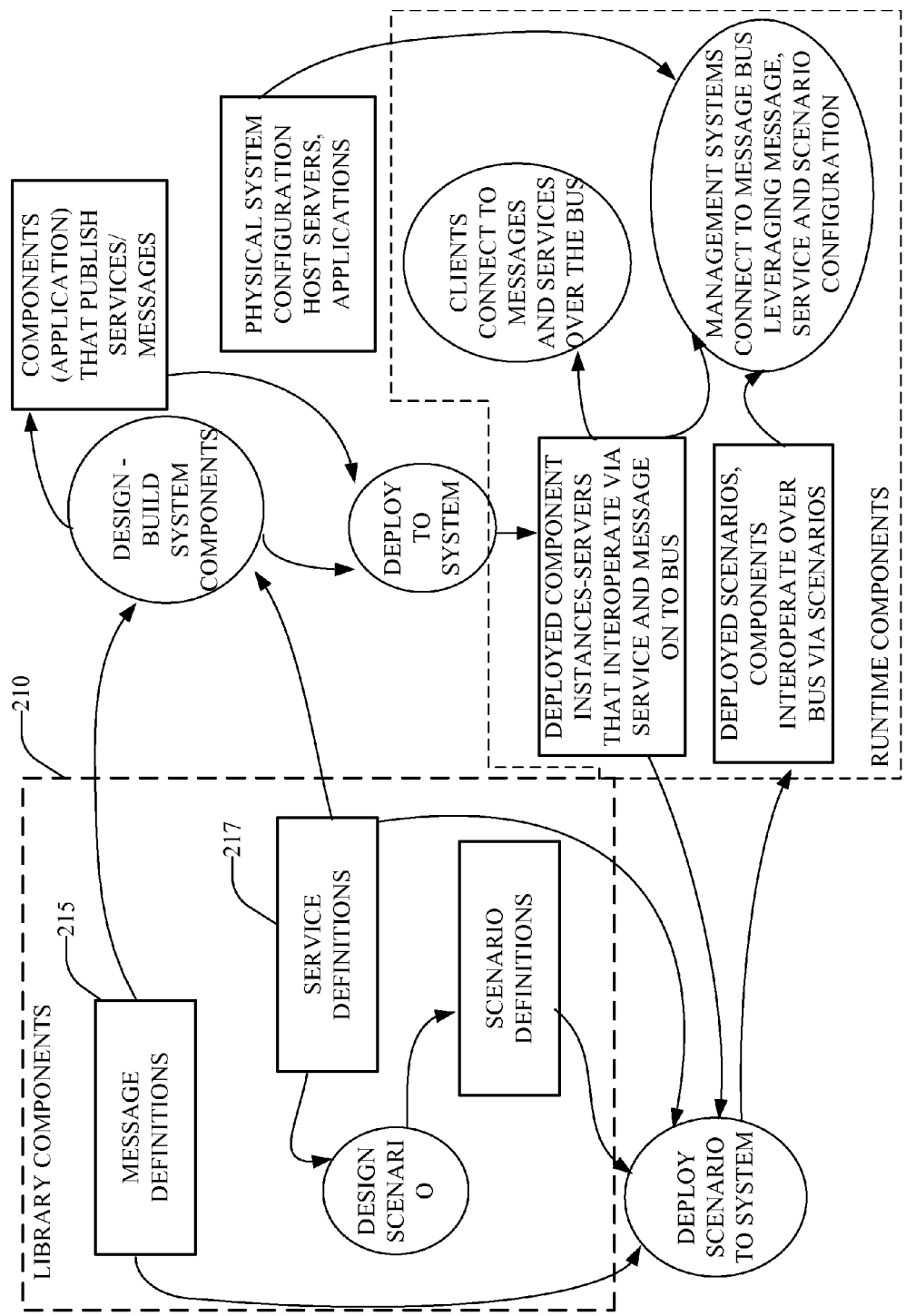
FIG. 2 illustrates exemplary library components that supply support for production system design/deployment process, according to an aspect of the subject innovation.

FIG. 2 illustrates exemplary library components that supply support for production system design/deployment process. Such library components 210 can be reverse engineered from deployed components (if allowed by security privileges.) Libraries contain logical definitions of messages, services and scenarios. Library components 210 of message definitions 215 and service definitions 217 can be used to build scenario definitions. Applications (software products, control system programs, and the like) can employ such definitions to build solutions that send and receive messages, publish and connect to services and publish scenarios that are supported. Accordingly, application solutions can be deployed to production systems, where they are bound to physical devices. Moreover, scenarios can be deployed to systems where they are bound to services and raw message interfaces supported by products in the system. In addition, scenarios can be extended to allow additional functionality to be provided typically without changing applications.

Furthermore, in a data driven architecture a directory can provide a logical view of the factory while resolving and/or providing necessary associations to physical location and/or device addressing information. The types of information required can include physical location of the data source/owner, physical location of the data subscriber, communications address for data source/owner and communications addresses for attributed data that can exist at multiple levels, for example.

When data is required, addressing and associations to that data can be made with the directory system. For example, the user can select the data using a logical UPM depiction of the plant. Depending upon the application requesting the data, as well as the role and requirements of the user, the directory interface can provide the appropriate addressing information to the required data. In some cases, such as automation device to automation device communications, the addressing can point directly to the data source/owner. In other cases, such as ERP human resources applications, the association can be a proxy server of the attributed data so as to isolate the servicing of the data requests from the real time control processing of the automation device that is the data source. It is to be appreciated that the physical location associated with the data can be that of the data source/owner while the communication address may be that of some other device on the network that is performing the role of adding attributes to the data or acting as a proxy server for that data.

Figure 3:
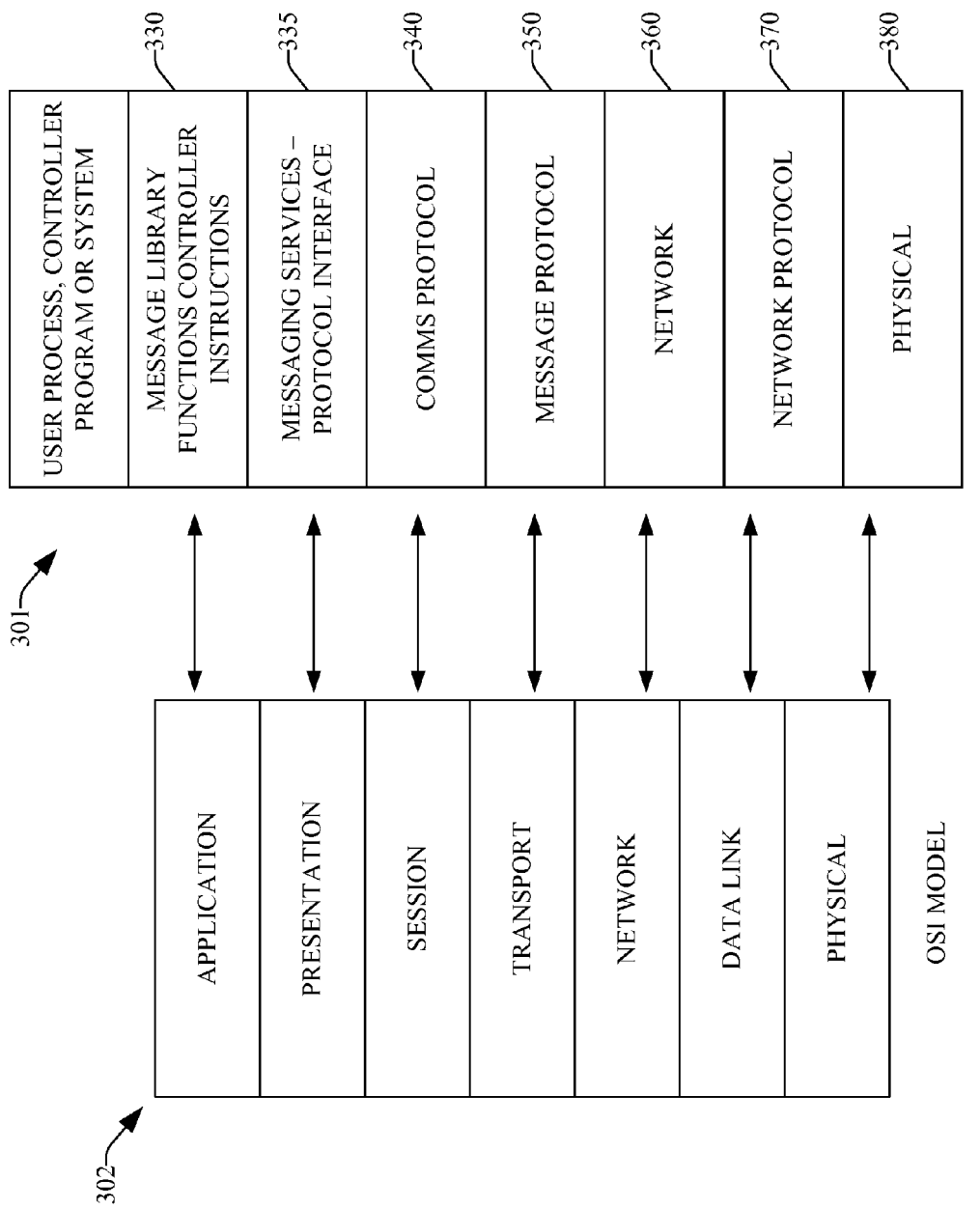
FIG. 3 illustrates a stacking arrangement for a UPM messaging protocol in comparison to the Open Systems Interconnect (OSI) model, in accordance with an aspect of the subject innovation.

FIG. 3 illustrates a stacking arrangement for a UPM messaging protocol 301 in comparison to the Open Systems Interconnect (OSI) model 302 in accordance with an aspect of the subject innovation. Stack 301 of the UPM messaging model incorporates user process, controller program or system that can invoke library functions/instructions for message exchange in accordance with an aspect of the subject innovation. The message library functions and controller instructions 335 can facilitate type conversions and exchange of messages with a message engine of the subject innovation. The messaging services protocol interfaces 335 manages data conversion and routes the message to other nodes or application objects. Like wise, stack 340 manages the communication protocol and present messages for delivery as well as receipt of messages. Moreover, stack 350 manages the message protocol that exchange data with other points. Stacks 360, 370, and 380 manage the network, network protocol and physical layer for physical transmission of messages, respectively.

Hence, message processing is partitioned to appropriate levels—e.g., the layering of message formats allows layers to focus on the functionality required at that level. Such communication includes tunneling down to any controller residing on any network (e.g., NetLinx, Control & Information Protocol (CIP), Data Highway Plus (DH+) based networks) to view, obtain and/or modify data, files, services and/or applications. The communication also provides for incremental updates to any file, service and/or application residing and/or executing within a controller or device. Such updates can be dynamic and mitigate any need for downloading new firmware to enhance functionality as well as provide revision management.

Figure 4:
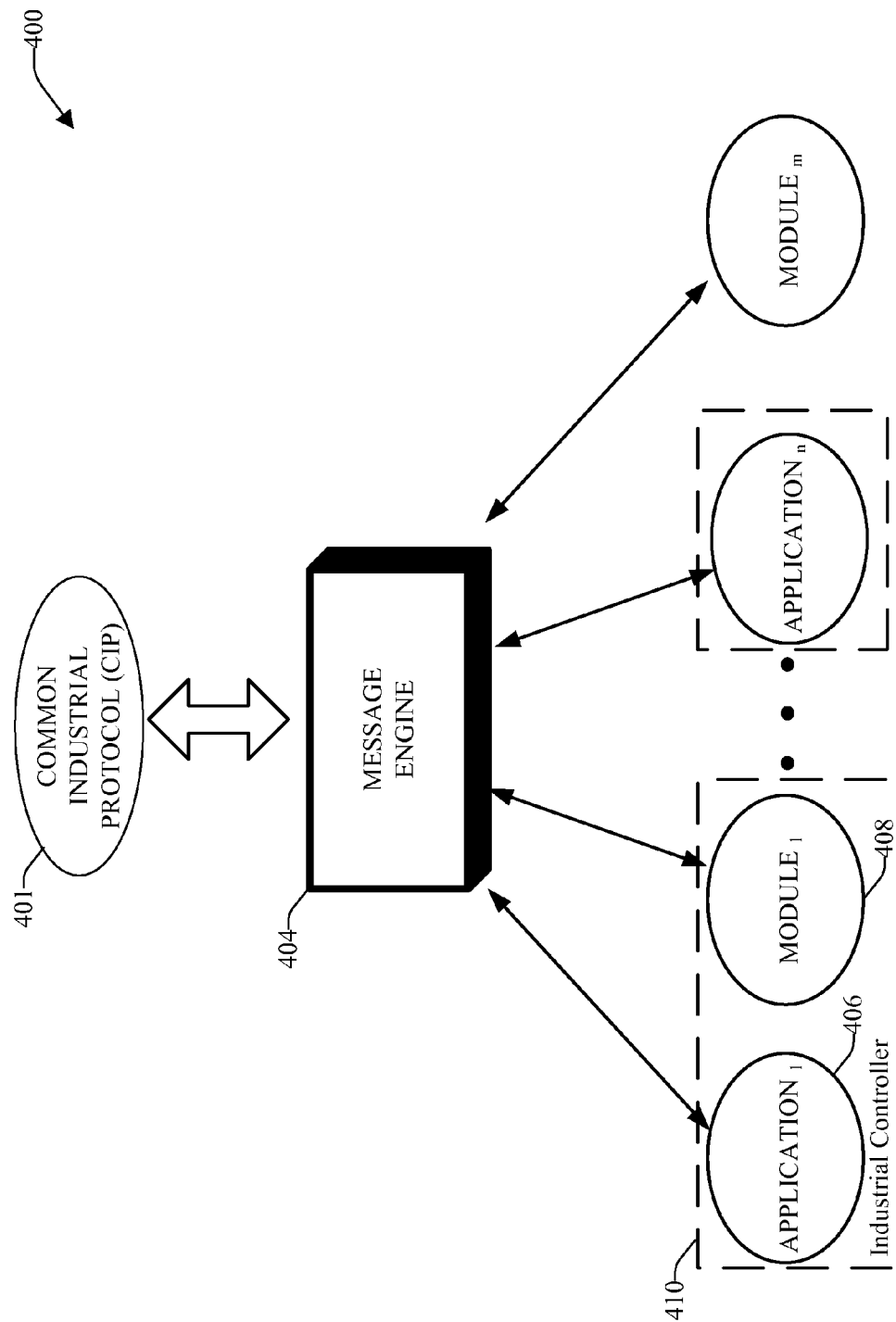
FIG. 4 illustrates a system that incorporates a message engine to normalize messaging of various messaging protocols and formats to form a UPM messaging in accordance with an aspect of the subject innovation.

FIG. 4 illustrates a system 400 that incorporates a message engine 404 to normalize messaging of various messaging protocols and formats to form a UPM messaging in accordance with an aspect of the subject innovation. The message engine 404 can provide a consistent interface, among a plurality of application(s) 406 and/or modules (s) 408, (m and n are integers), wherein events are sent/received consistently across the industrial plant. In general, the term module can refer to a computer-related entity, either hardware, a combination of hardware and software, software, or software in execution, as well as an elecro-mechanical component. For example, a module can be, but is not limited to, a process running on a processor, a processor, an object, an executable, a thread of execution, a program, and a computer. By way of illustration, an application running on a server and/or the server can be a module. In addition, a module can include one or more subcomponents. Moreover, those skilled in the art will appreciate that the inventive methods can be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The message engine 404 can further supply support for a plurality of message channels at different logical and physical levels, such as for example: diagnostics, production, and the like.

Accordingly, the industrial controller(s) 410 that reside on the factory floor can interact with the message engine 404 to facilitate normalizing a communication based on a common industrial protocol 401. For example, the industrial controller 410 can be employed to control a certain cell/unit or procedure, which can be desirably tested and/or debugged. Particularly, the industrial controller 410 can include at least a portion of control logic that is employed to effectuate the aforementioned procedure and/or cell/unit. Moreover, the industrial controller 410 can be a programmable logic controller (PLC). PLCs are small computers that are employed for automating real-world processes (e.g., controlling machinery within an industrial environment). Typically, PLCs are microprocessor-based devices with modular or integral input/output circuitry, wherein such circuitry is utilized to monitor status of field connected sensor inputs, and is further utilized to control output actuators according to a logic program. While PLCs can be employed within the system 400 as an industrial controller, it is to be understood that any suitable industrial control device can be employed in connection with the subject invention. For example, any suitable microprocessor and/or microcontroller can be utilized within the system 400 as an industrial controller.

Figure 5:
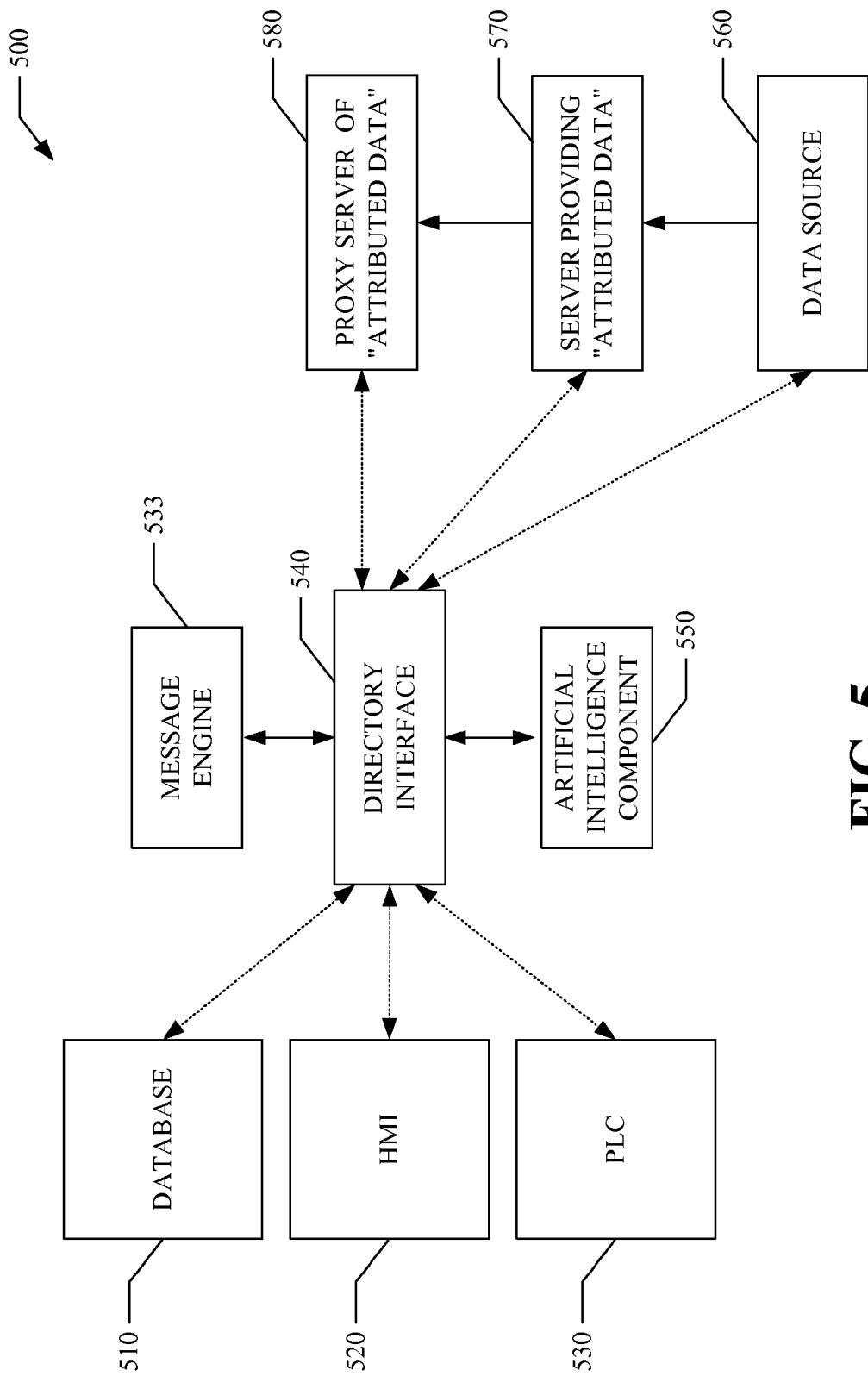
FIG. 5 illustrates an exemplary industrial automation network that employs a message engine to exchange messages and transfer data.

FIG. 5 illustrates an exemplary industrial automation network that employs a message engine 533 to exchange messages and transfer data to: a database 510, a human machine interface (HMI) 520 and a programmable logic controller (PLC) 530 via a directory interface 540. The directory interface can include an AI component 550 to facilitate efficient identification of desired data within a particular network. The directory interface 540 can be employed to provide data from an appropriate location such as the data source 560, a server 570 and/or a proxy server 580. Accordingly, the directory interface 540 can point to a source of data based upon role and requirements of a requester (e.g., database 510, HMI 520, PLC 530, and the like.) The database 510 can be any number of various types such as a relational, network, flat-file or hierarchical systems. Typically, such databases can be employed in connection with various enterprise resource planning (ERP) applications that can service any number of various business related processes within a company. For example, ERP applications can be related to human resources, budgeting, forecasting, purchasing and the like. Moreover, particular ERP applications can require data that has certain desired attributes associated therewith. Thus, in accordance with an aspect of the subject invention, the directory interface 540 can provide data to the database 510 from the server 570, which provides data with the attributes desired by the database 510. Various artificial intelligence components 550 can further be employed to facilitate identification of data with networks and applications.

As illustrated in FIG. 5, the message engine(s) 550 can leverage directory interface 540 and other UPM services to locate other message engines and their configurations as well as supported messages. Such information can further reduce the glue code in configuring and managing the system as message engines can determine the appropriate mapping and routing of messages through the system. In addition, a common view to system information (e.g., for proprietary and third party legacy) with additional perspective(s) of messaging system can be enabled via such message engine. The message engine(s) activities can facilitate: Filtering, Bridging, Routing, Propagation, Transformation and Monitoring of messages events in a customer's manufacturing system, for example. Also support can be provided for routing, data conversion, aggregation, and the like (e.g., third party and legacy systems can be integrated with public standards based interfaces.) Such message engines within an architecture of an industrial system enhances performance and facilitates system wide configuration/management.

Moreover, the HMI 520 can employ the directory interface 540 to point to data located within the system 500. An HMI can be employed to graphically display various aspects of a process, system, factory, and the like to provide a simplistic or user-friendly view of the system. Accordingly, various data points within a system can be displayed as graphical (e.g., bitmaps, jpegs, vector based graphics, clip art and the like) representations with desired color schemes, animation, and layout.

The HMI 520 can request data to have particular visualization attributes associated with data in order to easily display such data to the HMI 520. For example, the HMI 520 can query the directory interface 540 for a particular data point that has associated visualization attributes. The directory interface 540 can determine the proxy server 580 contains the attributed data point with the desired visualization attributes. For instance, the attributed data point can have a particular graphic that is either referenced or sent along with the data such that this graphic appears within the HMI environment instead of or along with the data value.

As explained earlier, the PLC 530 can be any number of models such as Allen Bradley PLC5, SLC-500, MicoLogix, etc. The PLC 530 is generally defined as a specialized device employed to provide high-speed, low-level control of a process and/or system. The PLC 530 can be programmed using ladder logic or some form of structured language. Typically, a PLC can utilize data directly from a data source (e.g., data source 560) that can be a sensor, encoder, measurement sensor, switch, valve and the like. The data source 560 can provide data to a register in a PLC and such data can be stored in the PLC if desired. Additionally or alternatively, data can be updated (e.g., based on a clock cycle) or output to other devices for further processing.

Figure 6:
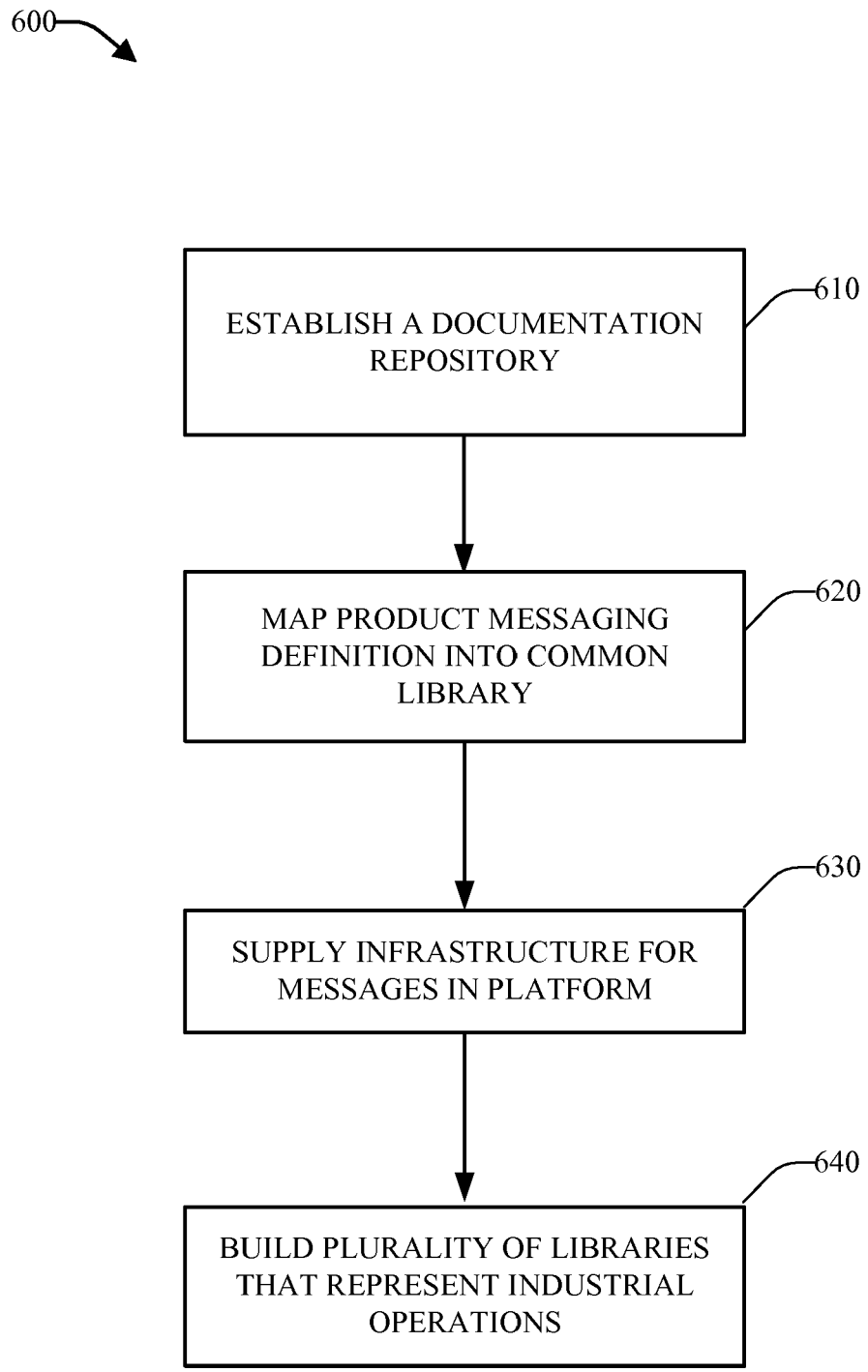
FIG. 6 illustrates a related methodology of facilitating message exchange as part of a factory automation platform.

FIG. 6 illustrates a methodology in accordance with an aspect of the subject innovation. While the exemplary method is illustrated and described herein as a series of blocks representative of various events and/or acts, the subject innovation is not limited by the illustrated ordering of such blocks. For instance, some acts or events may occur in different orders and/or concurrently with other acts or events, apart from the ordering illustrated herein, in accordance with the innovation. In addition, not all illustrated blocks, events or acts, may be required to implement a methodology in accordance with the subject innovation. Moreover, it will be appreciated that the exemplary method and other methods according to the innovation may be implemented in association with the method illustrated and described herein, as well as in association with other systems and apparatus not illustrated or described. Initially, and at 610 a documentation repository for messages, events, commands and alarms can be established for the industrial setting. For example, an alarm can include as a specialization of condition event. The initiation of an alarm can occur via an alarm event, and a message that carries the alarm to the receiver can signify an alarm message. Likewise, an activity can occur at a given point in time in the system, wherein an automation product generates and receives events. The information associated with an event can be transmitted as a message between source and receiver of event information. In addition, a command can include an order (request) that is sent from a source to a receiver to perform some specific function. The initiation of such order is via a command event, wherein a message that carries the command to the receiver is classified as a command message.

Next and at 620, product messaging definitions can be mapped into the common library. Accordingly, and at 630 associated infrastructure for managing messages and referencing message definitions in libraries by industrial products can be provided in the platform as UPM structures. Next, and at 640 a plurality of libraries can be built that represent various industrial operations for the industrial setting. Such can facilitate communication (e.g., via preferred channels) to other services/products, wherein the configuration and management of messaging is consistent across the system.

Figure 7:
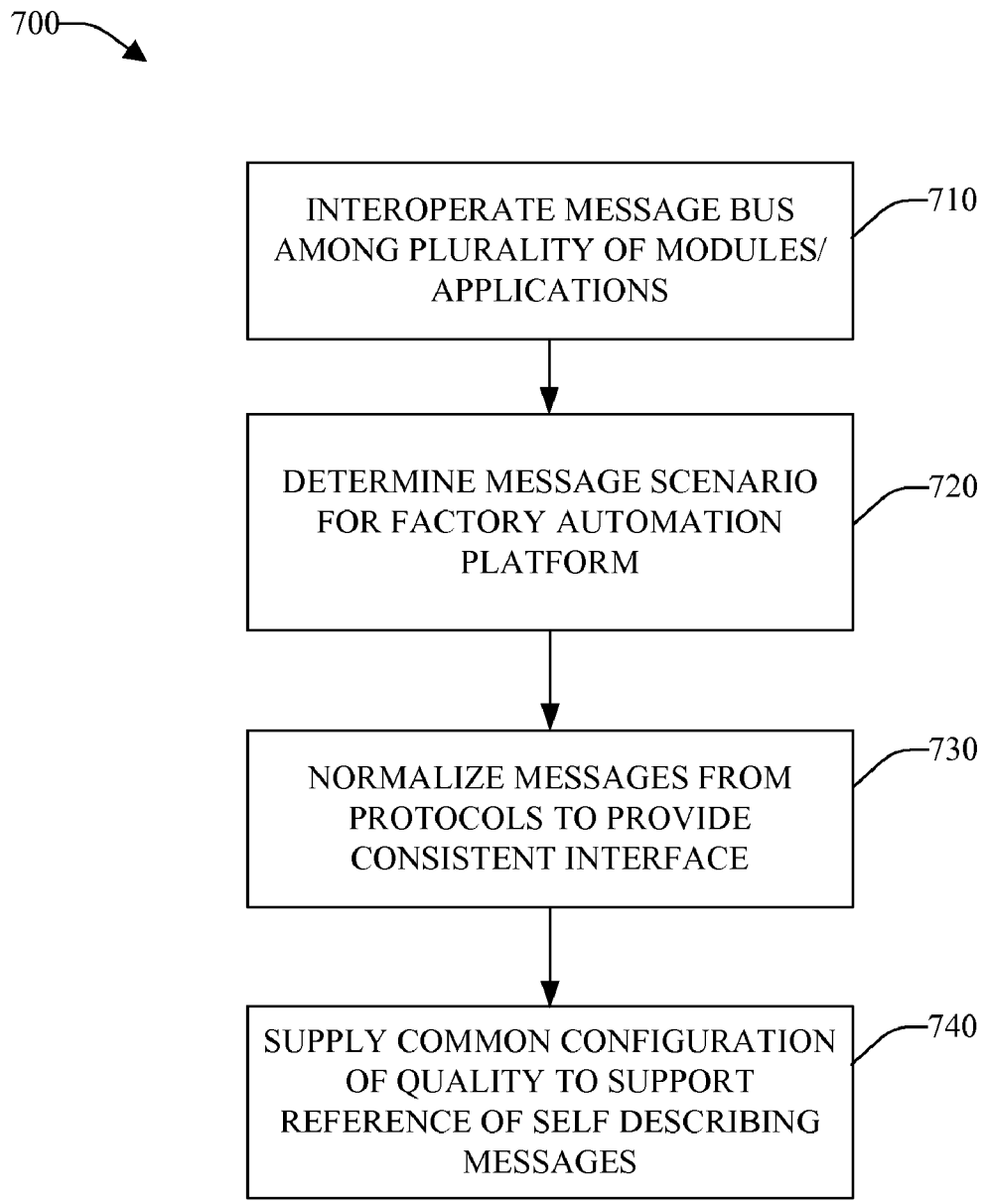
FIG. 7 illustrates an exemplary messaging exchange methodology in accordance with an aspect of the subject innovation.

FIG. 7 illustrates a related methodology of facilitating message exchange as part of a factory automation platform. Initially and at 710, a message bus that interacts with message engines is interoperated among a plurality of modules and applications. Such message engines can leverage directory and other UPM services to locate other message engines and their configurations as well as supported messages. The message engine(s) activities can relate to Filtering, Bridging, Routing, Propagation, Transformation and Monitoring of messages events in a customer's manufacturing system, for example. Next, and at 720 message engine scenarios can be determined for the factory automation platform, wherein these scenarios can be employed to map third party product/devices with the factory automation platform. Subsequently, and at 730 messages from various protocols can be normalized to provide a consistent interface where events and modules are sent/received across the system and message bus. Accordingly, and at 740 a common configuration of quality e.g., events, command, event, alarm, scenarios, transactions and messages) can be provided that supports a reference of self-describing messaging. For example, messages for a library can be defined (and restored) for material, equipment, and the other industrial components for a factory.

Figure 8:
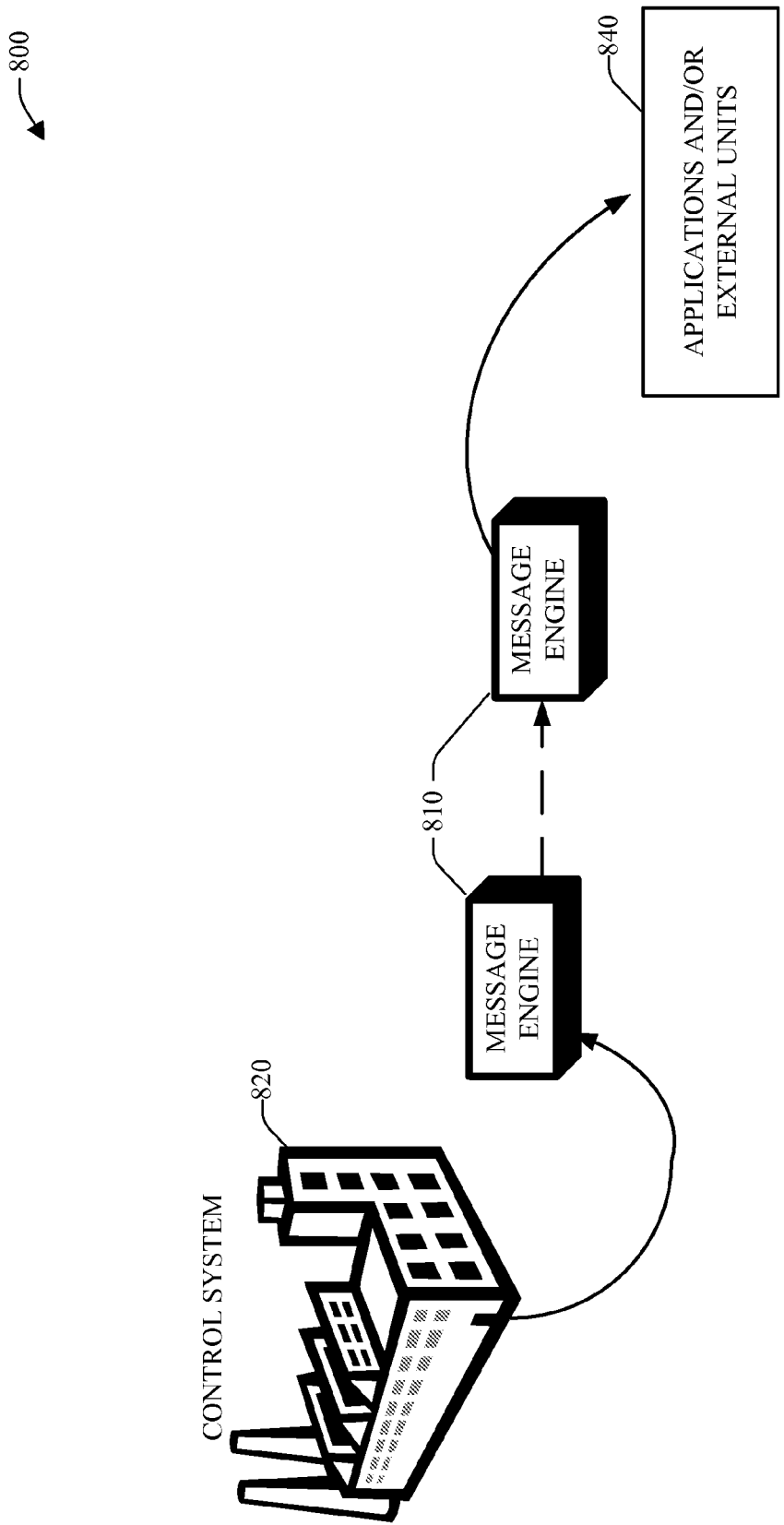
FIG. 8 illustrates an exemplary messaging exchange between control systems and applications via a message engine in accordance with an aspect of the subject innovation.

FIG. 8 illustrates an exemplary messaging exchange between control systems and applications (e.g., software applications), via a message engine in accordance with an aspect of the subject innovation. The system 800 facilitates messaging with and/or within an industrial automation environment. The system 800 includes a message engine(s) 810, which normalizes messaging of various messaging protocols and formats, and supplies a mechanism to reliably exchange messages (e.g., information, data, requests, queries, control signals, and the like) with a control system 820. For example, in one aspect, the message engine 810 can function as an application interface and provide common access points between applications (e.g., 820 and 840.) As illustrated, in the messaging exchange system 800 applications can interact with messaging systems by interfaces exposed by the message engines (810), wherein such message engine(s) exchange information between sender and receiver. As such, the presentation of the messaging infrastructure can be consistent with each user's role and location.

For example, the control program associated with the control system 820 can send a message via the 'SendMessage' instruction and the software application receives a message via a 'RecieveMessage' function. Conversely a software application 840 can send a message via a 'SendMessage' function and the control program of the control system 820 receives a message via the 'ReceiveMessage' instruction. The systems can also employ a same set of application level constructs. It is to be appreciated that the messaging infrastructure can vary in functionality, and various levels of functionality can be provided depending on the host environments and associated system. Moreover, each messaging level can support a support a common configuration interface and presentation of public interfaces, allowing consistent presentation of management consoles for messaging across the system. Hence, at each level, message engines 810 can provide consistent external interfaces to products at that level and can bridge across to other networks providing the necessary data/security mappings and conversions between the networks. Moreover, data can be replicated across applications in the same machine or across machines. The UPM messaging of the subject innovation provides the plumbing to enable such replication, via a consistent suite of interfaces. For example, the user interface settings in the system can generate configurations for messaging components that replicate data between the system components. The message system provides the replication capability and can generate status information on the success and frequency of the replication.

Message engine(s) 810 can also provide for reliable messaging by behaving as a flexible data store. For example, any message transmitted by a component of the control system 820 that is granted write and/or read privileges can be stored within and/or retrieved from the message engine(s) 810. Likewise, any message transmitted to the control system 820 by a component with write and/or read privileges can be stored within and/or retrieved from the message engine(s) 810. Thus, transmission of a message can be independent of a state of a recipient (e.g., an entity external to the control system 820), and/or receipt of the message can be independent of a state of a sender (e.g., an entity external to the control environment and/or one or more components of the control system 820); and, thus, messages can be reliably exchanged (e.g., synchronously or asynchronously) regardless of whether both the sender and the recipient are concurrently available to interact and/or exchange data.

Such an arrangement for message exchange can include a 1 to 1 (1:1), 1 to many (1:n, n being an integer), or many to 1 (n:1) ratios of message senders and receives, and various levels of quality of service (QOS) including volatile messages such as "fire and forget," which is send once with no guarantee of delivery. Other arrangements such as the QOS scale of delivery and non-volatile messaging; send with guaranteed delivery; send once and only once with guarantee of delivery are well within the realm of the subject innovation. Accordingly, such messaging engines can facilitate communication (e.g., via preferred channels) to other services/products, wherein the configuration and management of messaging is consistent across the system.

The message engine(s) 820 can also reside within the control system 820 (e.g., within an associated industrial controller.) Moreover, the message engine 810 can reside in connection with a Human Machine Interface (HMI), an I/O module, a bridge, an I/O block, and the like. Moreover, the applications(s)/external unit 840 can be associated with a state machine, a robot, a subscriber, a database, a server, a client, an integration server, an Enterprise Resource Planning (ERP), a Manufacturing Execution System (MES), and a Machine Control (MC) system. In addition, the external entities can include one or more business systems and/or applications. Such systems and/or applications can further be associated with one or more integration servers, middleware and/or other components that can communicate with the control system 820. The message engine(s) 810 can supply a common configuration of quality (e.g., events, command, event, alarm, scenarios, transactions and messages) and provide support for a reference and self-describing messaging.

Moreover, the sender of the message may or may not know that the message is routed through the message engine 810. For example, the sender can transmit a general broadcast or specify a destination. Upon transmission, typically the sender need not know that the message is received and/or stored within the message engine 810 before being conveyed to the destination.

Conversely, in other aspects of the subject innovation, the sender knows the routing path is through the message engine 810. Moreover, the message engine(s) can leverage directory and other UPM services to locate other message engines and their configurations as well as supported messages. Such information can further reduce the glue code in configuring and managing the system as message engines can determine the appropriate mapping and routing of messages through the system. In a related example, the control system 820 can execute (e.g., invoke, instantiate an instance thereof . . . ) a reliable message instruction that determines the location of the message engine 810, to establish a connection with such message engine (e.g., employs a cached connection or pool of connections). The control system 800 can also deliver the message to the message engine 810, and/or receives an acknowledgment from the message engine 810 regarding the message transmission.

Such approach can further be employed within a publish/subscribe and/or a polling based messaging system, for example. With a publish/subscribe based system, the message can be associated with one or more recipients, including any or all recipients subscribed to receive the message and/or read messages posted in a particular message storage region such as a topic, a queue, a mailbox, and the like. The message engine(s) 810 and/or other components can transmit an event and/or a notification to such subscribers (or a generic broadcast) to apprise them that a message has been posted, published, and establish, or utilize an connection with the subscriber and send them the data, queue the data until the subscriber is available again according to a retention policy, and the like. Publishers and subscribers can maintain a connection to the message engine 810, with subscribers pending on a specific message queue, or one to many information topic(s). Accordingly, when a publisher posts a message to a queue or topic, all of the subscribers are immediately notified and can receive the actual message as part of the notification. Also, a subscriber can request the message engine 810 to provide a higher level of service and ask the message engine 810 to queue the subscriber's messages if it is offline. With this type of service, a subscriber can be assured not to miss important messages even when the network connection is intermittent.

The publishers, subscribers and brokers can negotiate amongst each other to establish the most efficient and highest performance data transmission mechanism. Examples include choosing faster network links, aggregation of data messages (e.g., offer to produce one larger message with two topics instead of two separate messages), and unicast or multicast, or broadcast messages when desirable, and redirection to higher performance servers. A client can request that the message engine 810 only send messages based upon a qualification, send messages with a minimum time delay between transmissions, group multiple messages together in batches, delete unhandled messages after elapsed time (e.g., 24 hrs), forward to another queue after elapsed time (e.g. 10 minutes before forward to escalation queue or garbage), and the like. Also, one or more of the subscribers can concurrently and/or serially access the stored message. Such access can include, reading, copying, modifying, removing, deleting, popping, and the like. With a polling based system, the recipient can periodically poll the message engine 810 to determine whether a message is available to be read and/or retrieved.

In a related aspect one or more of the recipients can concurrently and/or serially poll and access the stored message. In another instance, a point-to-point technique can be employed, wherein a recipient handles (e.g., extracts, copies, removes, and the like) a message from the message engine(s) 810. In addition, a common view to system information (e.g., for proprietary and third party legacy) with additional perspective(s) of messaging system can be enabled via such message engine. The message engine(s) activities can facilitate: Filtering, Bridging, Routing, Propagation, Transformation and Monitoring of messages events in a customer's manufacturing system, for example. Also support can be provided for routing, data conversion, aggregation, and the like (e.g., third party and legacy systems can be integrated with public standards based interfaces.) Such message engines 810 within an architecture of an industrial system enhances performance and facilitates system wide configuration/management.

Likewise, the control system 820 can include one or more control systems (not shown), wherein respective control systems can include one or more industrial controllers (not shown) that can control various plants, machines, apparatuses, processes, systems, equipment, and the like. In addition, the one or more industrial controllers can execute one or more intelligent agents and/or control logic (e.g., programs, routines, instruction sets, and the like, programmed in industrial and/or other languages) to control the various plants, machines, apparatuses, processes, systems, equipment, and the like. Such control can include an ability to obtain and/or analyze inputs and/or generate outputs that effectuate the controlled plants, machines, apparatuses, processes, systems, equipment, and the like. Furthermore, the one or more controllers can include one or more receiving, transmitting and/or transceiving components (not shown), which can facilitate exchanging messages. Moreover, the message engine(s) 810 and/or any of the components of the control system 820 can be hardware, software and/or firmware based. For example, industrial controllers within the control environment can be soft (e.g., software implemented) and/or physical controllers (e.g., hardware with suitable software and/or firmware), include Ethernet interfaces or interface with Ethernet interfaces over backplane or other network connections, human machine interface and I/O module devices, and/or a combination thereof.

Furthermore, the control system 820 can be associated with essentially any suitable communications protocol; such as: Control and Information Protocol (CIP) protocols for communicating via DeviceNet, ControlNet, EtherNet/IP and/or Controller Area Network (CAN), fieldbus protocols for communicating via Profibus, Interbus-S, RIP, P-Net, and AS-i, Transport Control Protocol (TCP) and Internet Protocol (IP) for communicating via the Internet, NetBios Extended User Interface (NetBEUI) for communicating via Large and Wide Area Networks (LANs and WANs), File Transfer Protocol (FTP) for communicating with workstations, servers and the like, Hyper Text Transfer Protocol (HTTP) for communicating via the World Wide Web (WWW), and the like. In addition, communication with the message engine 810 can be through wire and/or wireless communication techniques. Examples of communications schemes that can be employed in accordance with the subject invention include Ethernet, serial port, parallel port, coaxial cable, Infrared (IR), Blue-Tooth, Universal Serial Bus (USB), Firewire, WiFi, WiMax, 802.11 A,B,G, 802.15.4, Universal Plug and Play (UPnP), Ultra WideBand (UWB) and the like. Examples of suitable communications mediums include category 1-5 wire (e.g., CAT5 UTP 8-wire cable), coaxial cable, USB, RS-232, RS-485, and the like.

Moreover, the message engine(s) 810 can incorporate a memory or any suitable medium that can store information; such as read only memory (ROM), programmable ROM (PROM), electrically programmable ROM (EPROM), electrically erasable programmable ROM (EEPROM), battery backed RAM, MRAM or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM), battery backed RAM. Storage can include disk drives, both mechanical and solid state such as SATA/IDE/ SCSI disk drives, micro drives, USB and compact flash devices, and remote storage like network file system (NFS), common internet file system (CIFS) shares, storage area networks (SAN), network attached storage (NAS), and iSCSI interfaces, for example.

Figure 9:
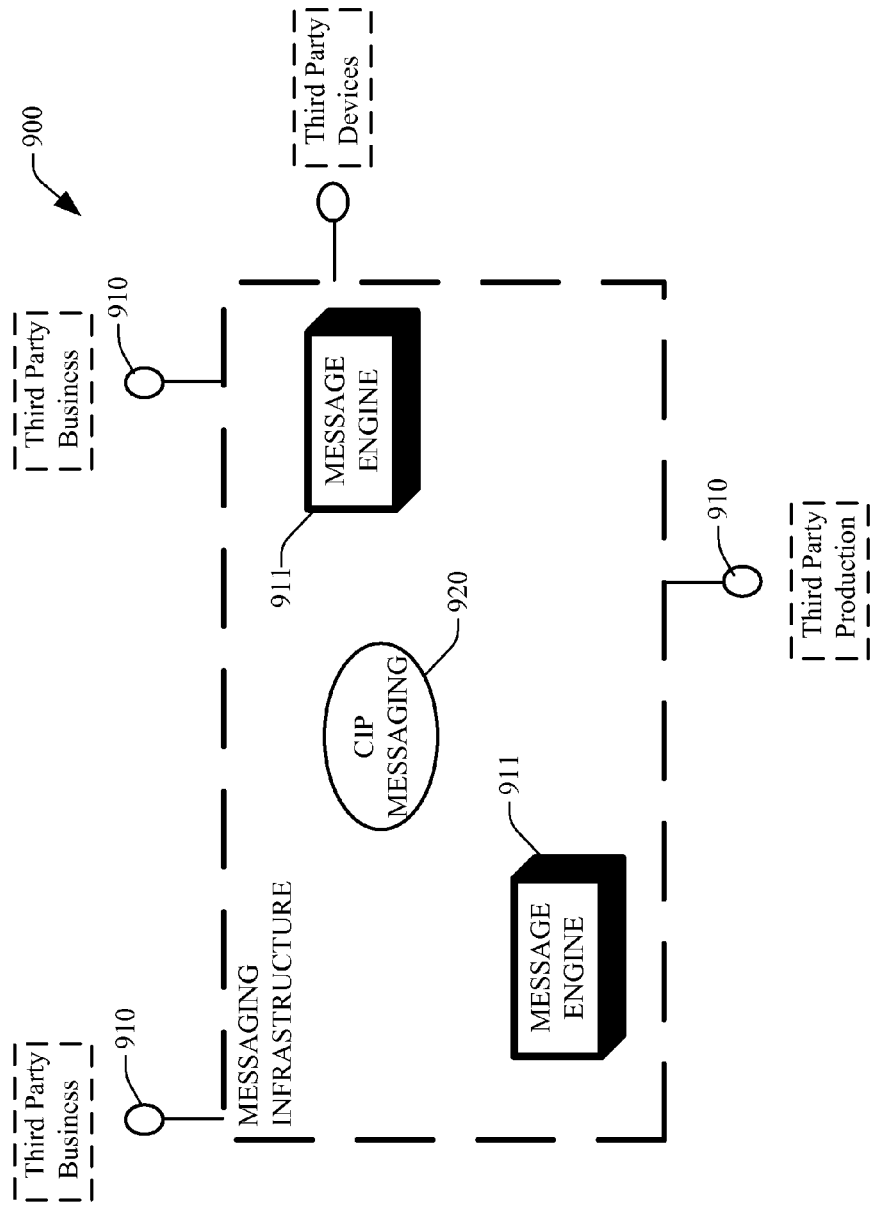
FIG. 9 illustrates an interaction of a message engine with third party applications in accordance with an aspect of the subject innovation.

FIG. 9 illustrates an interaction of a message engine(s) 911 with third party applications in accordance with an aspect of the subject innovation. The message engine(s) 911 can supply real time exchange of instant messaging among modules/applications, wherein the controller capabilities can evolve around the UPM messaging capabilities. The UPM messaging infrastructure 900 can support mapping from such internal premium connectivity interface to a public open interface for third party connectivity and other legacy systems. The interfaces 910 represent service and message level application interfaces to the message bus (not shown). The Control and Information Protocol (CIP) protocols 920 can interact with the message engines to facilitate message exchange as part of the messaging infrastructure.

Figure 10:
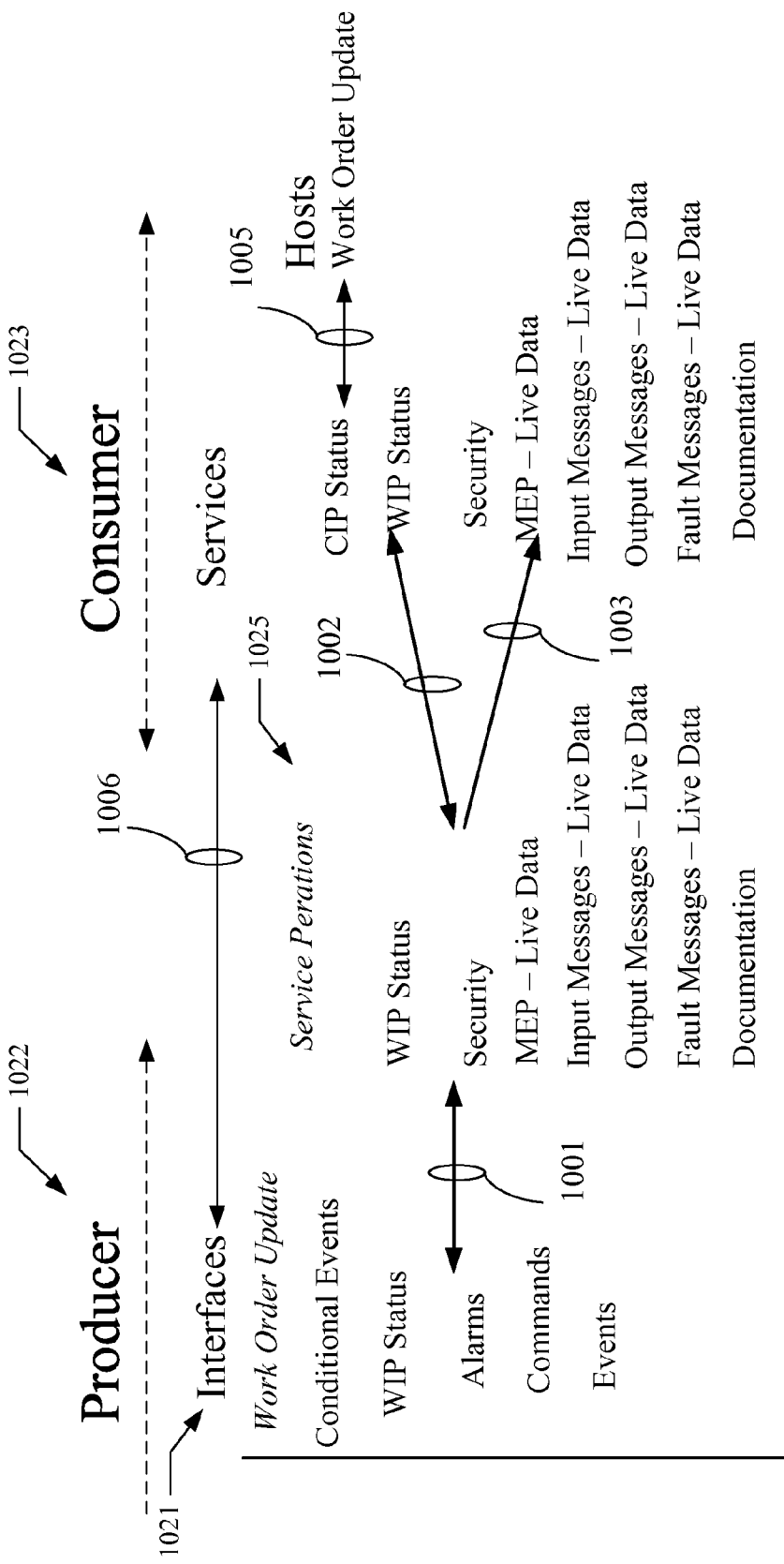
FIG. 10 illustrates association of service information with interface information and the hosts that support such services.

FIG. 10 illustrates a further aspect of the subject innovation wherein relationship of services to interface is illustrated. Typically an interface 1021 presents a user (e.g., an engineer of the industrial plant) with a boundary that is shared between application that is associated with the user and other applications in the system. A service operation 1021 can also be associated with additional information required to connect the applications together. Such information can be provided by engineers, system integrators or system administrators depending on customer requirements and capabilities. The interfaces 1021 can also be defined as part of the definition of classes or by importing from external interface or service definitions, wherein a module editor can observe service information as additional service attributes associated with the interface.

For example, a client to the modules interface can locate services that support the interface that is being searched for. Such service can advise the client of the policies (security, format, and the like), transports (in memory, HTTP, and the like) and diagnostics that need to be satisfied to connect the modules together. This information can be further grouped into the format appropriate to the users view. Such information can also be filtered by port (e.g.: show me in memory only) or by interface function.

FIG. 10 also illustrates how the service information can be associated with interface information and the hosts that support such services. The service can contain the context of the interface required for implementation of the interface. Such information can facilitate standardizing connections to interfaces, for example when multiple transports are available. Services allow such transport options to be available in a consistent manner, and hence minimizing complexity. As illustrated in FIG. 10, at producer 1022, engineers of the industrial plant can expose interface from applications to associate metadata with the interface for required client interaction via service operation and service meta data. As illustrated at 1006 the interfaces can be aligned with services; e.g., the interface can be an application developer view, wherein the service is the operational/implemented view. Moreover, the clients can browse services to locate functionality, and such services can encompass client/system view of exposed functionality, wherein the system view identifies the "what", "where" and "how". In addition, the service operation enables association of communications and deployment data with action on the interface (e.g., input, output, notification and the like). Messages are common format of the arguments/data supported on the interface and in communication/mapping.

Figure 11:
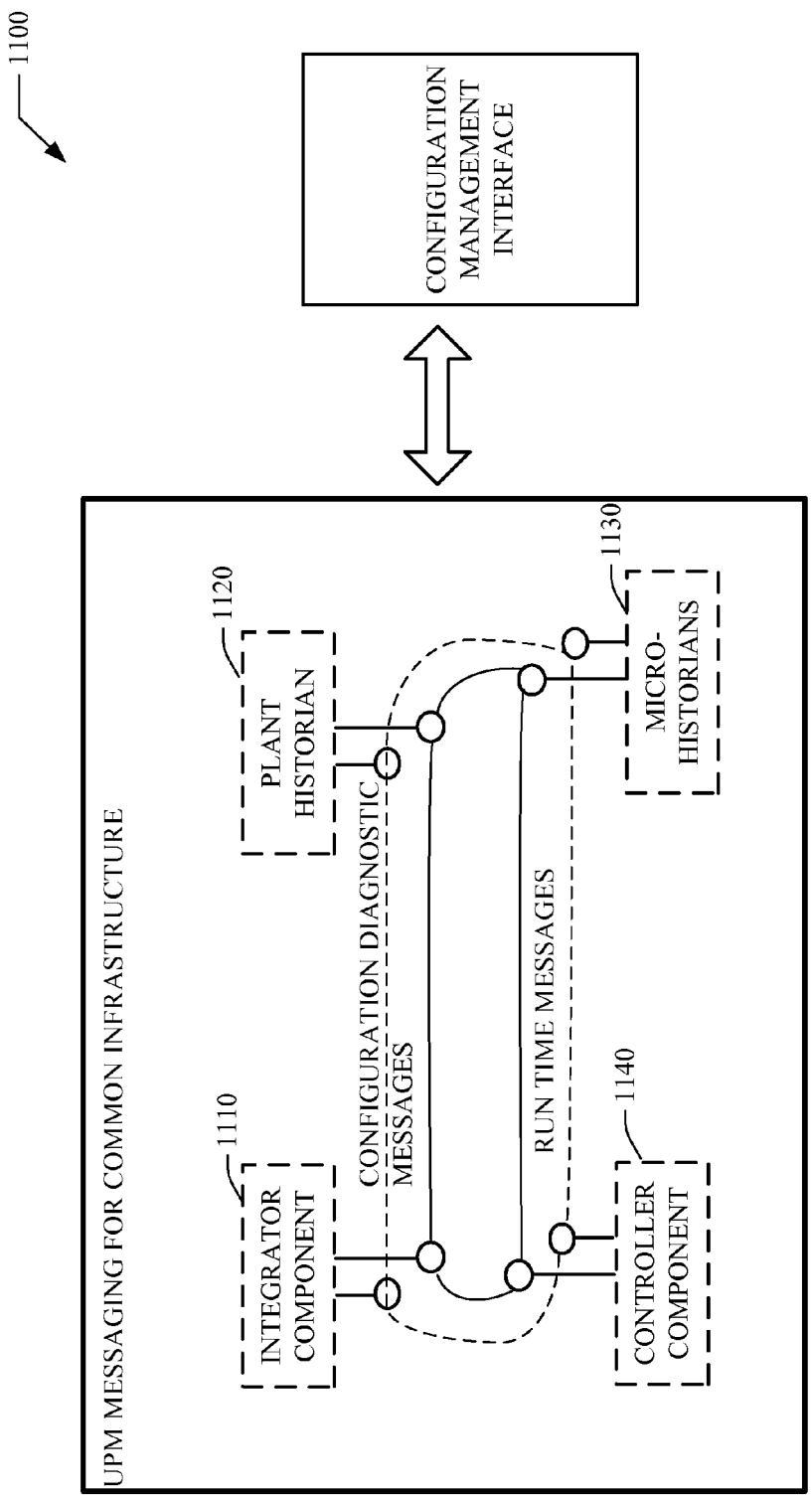
FIG. 11 illustrates a particular messaging system that incorporates a messaging engine in accordance with an aspect of the subject innovation.

FIG. 11 illustrates a particular messaging system that incorporates a messaging engine in accordance with an aspect of the subject innovation. As illustrated, the UPM messaging system 1100 provides a common infrastructure to glue products such as integrator component 1110, a plant historian 1120, micro historians 1120 and controller component 1140 together (along with UPM message definitions) and provide a common management interface. UPM messaging also provides the infrastructure for interoperation with third party products, which can also be hidden from the user. As explained in detail infra. Such integration can further include interfaces to external information such as: Web service interface, synchronized copies of data: e.g.: Data replication across data stores, and also references to external information: live Data Tag backed MES data value.

Figure 12:
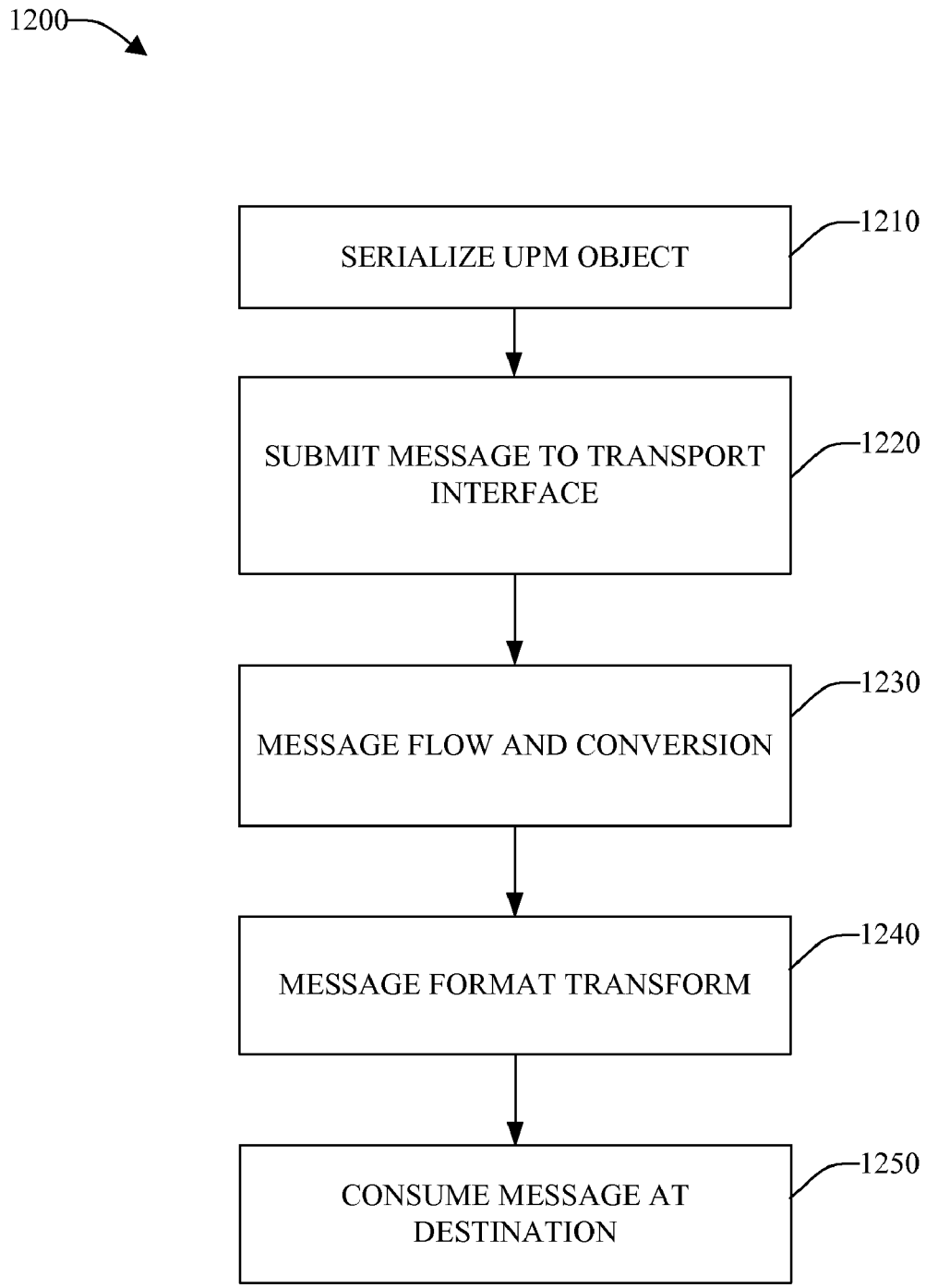
FIG. 12 illustrates a further methodology of exchanging a message from a source to a destination in accordance with an aspect of the subject innovation.

FIG. 12 illustrates a further methodology 1200 of exchanging a message from a source to a destination in accordance with an aspect of the subject innovation. Initially and at 1210, the message engine of the subject innovation serializes a UPM object or can populate a specific message(s) (e.g., a message processed in a scenario is managed the same as stand alone events, alarms, commands.) For example, this can involve reading in messages supplied from library function/ instruction or message input queues Such message is then submitted to a transport interface at 1220, for example by identifying the output protocol interfaces to dispatch thereto. Next and at 1230 the message flows in the system, and can further undergo data conversions related thereto (e.g., syntactic conversion is managed by the messaging system, and semantic conversion is managed by the messaging system in conjunction with application objects that understand the context of message content). At 1240 the message format transforms as it crosses network and application boundaries. Subsequently, and at 1250 such message can be consumed by a destination application where it is de-serialized into an object the application can work with. Message destinations can be fully qualified addresses, or a publication to a logical topic. If the destination is a logical topic the message engine can locate subscribers to the topic and dispatch the message to the service interfaces associated with the subscribers.

Figure 13:
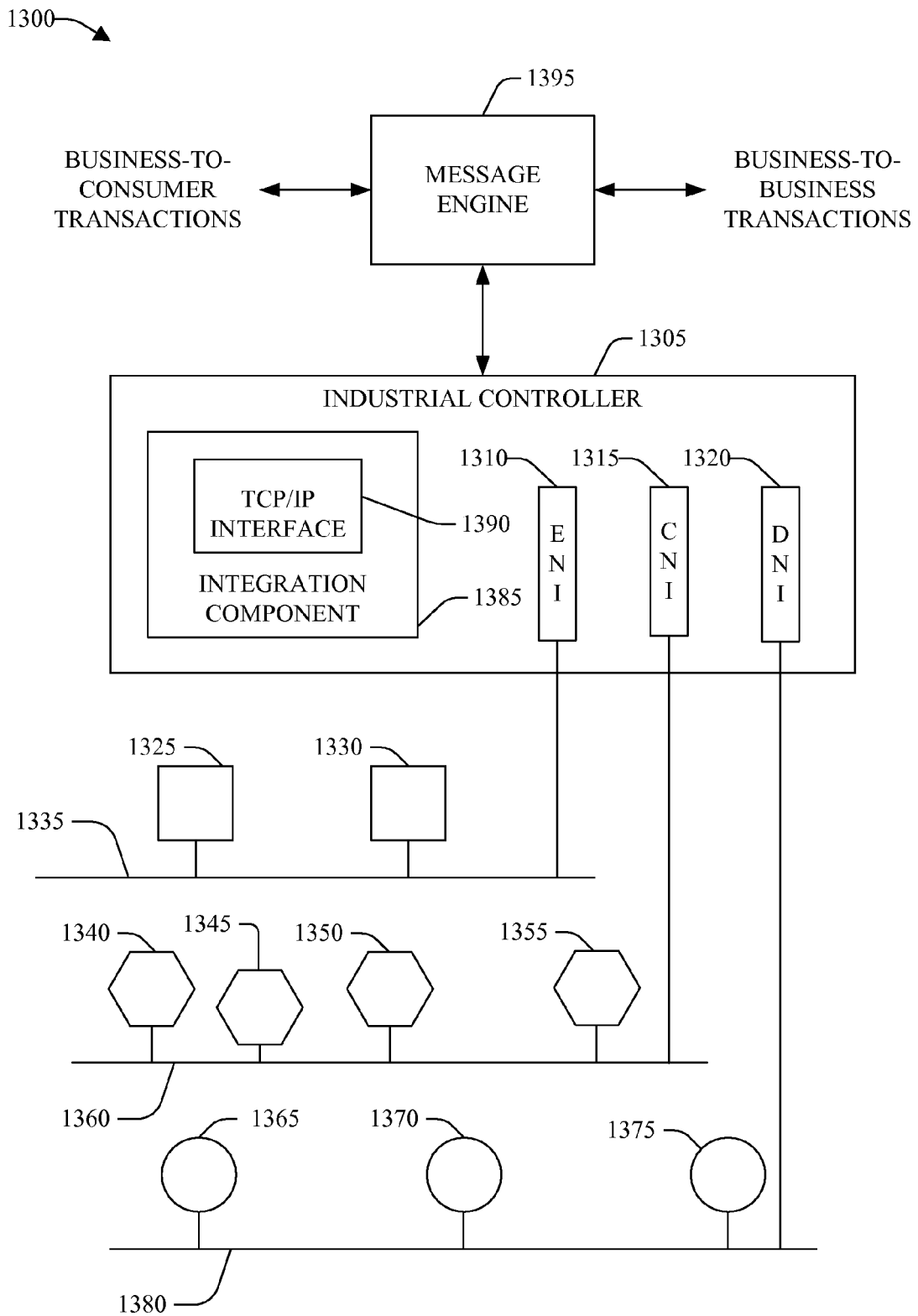
FIG. 13 illustrates a message engine that normalizes messaging of various messaging protocols and formats, wherein various systems of such plant can map thereto.

FIG. 13 illustrates a system 1300 that exchange messages between control and business systems through a message engine. The system 1300 includes an industrial controller 1305 with an Ethernet/IP interface 1310, a ControlNet interface 1315 and a DeviceNet interface 1320. The Ethernet/IP interface provides for communication with a device 1325 and a device 1330 residing on an Ethernet/IP network 1335. The ControlNet interface 1315 provides for communication with non-TCP/IP based devices 1340, 1345, 1350 and 1355 (collectively referred to hereafter as devices 1340-1355) residing on a ControlNet network 1360. The DeviceNet interface 1320 provides for communication with non-TCP/IP based devices 1365, 1370 and 1375 (collectively referred to hereafter as devices 1365-1375) residing on a DeviceNet network 1380. The devices 1325, 1330, 1340-1355 and 1365-1375 can be utilized to control various industrial processes, machines, manufacturing equipment, plants, and the like and can include input, output, memory and processing modules to facilitate control. Respective controllers can execute control programs, routines, instruction sets, and the like, which obtain and/or analyze inputs and/or generate outputs that effectuate the controlled entity (e.g., a motor, a drive, a valve, a solenoid, a switch . . . ). Such control programs can be programmed in essentially any programming language including industrial control languages (e.g., ST, SFC, FBD, IL and LD), C, C++, C#, GML, Java, Flow-Charts, etc., and/or any combination thereof, and/or include new instructions for the purpose synchronous data movement and/or performing transactions and/or event based tasks. These event based tasks can be configured to block and wait on the reception of a new message, or a message delivery.

The industrial controller 1305 further includes an integration component 1385 with a TCP/IP adapter 1390, which can provide a TCP/IP gateway between the devices 1325, 1330, 1340-1355 and 1365-1375 and the message engine 1395. The message engine 1395 can be a computer, server, cluster, or service oriented architecture (SOA) designed and utilized to couple and facilitate interaction between business and/or consumer trading partners. For example, two businesses that employ disparate operating systems and/or applications can utilize the message engine 1395 to exchange messages across internal and external networked computer systems. Likewise, a consumer and a business can utilize an message engine 1395 for interaction between different systems. Commerce between business partners generally is referred to as business-to-business (B2B) commerce and typically includes transactions between two businesses exchanging funds, goods, services and/or data. Commerce between a business and a consumer generally is referred to as business-to-consumer (B2C) commerce and commonly encompasses transactions such as the exchange of services, information and/or products. The message engine 1395 can act as a data switch with adapters for the various platforms and/or application interfaces.

It is to be appreciated that the message engine 1395 can be designed to support various prepackaged, customized, and/or legacy applications. Such applications can be designed based on standards such as XML, HTTP, JMS, SOAP, LDAP, WS-*, and the like. In addition, both hub-and-spoke based servers and network-centric based integration servers can be employed in accordance with aspects of the subject invention. In general, with hub-and-spoke based integration servers, applications connect through a central server, which manages communication, data translation, and process interactions among the connected systems and applications. With network-centric bus based integration servers, nodes are linked along a common backbone, and communication between interconnected systems and applications travel along the backbone to the integration server that handles the data transformation, translation, and routing to the receiving nodes.

In addition, the TCP/IP adapter 1390 can provide a TCP/IP gateway between the devices 1325, 1330, 1340-1355 and 1365-1375 and the message engine 1395. This gateway can be utilized as an Ethernet, a web, a file transfer, an HTTP, an HTTPS, an operating system and/or execution environment such as a Java virtual machine (JVM) and API. In addition, the gateway can provide for data transports and API such as JMS, JDBC, JTA, etc. Furthermore, the gateway can provide firewall and/or security capabilities such as SASL (e.g., Kerberos . . . ) and SSL between the controller 1305 and the message engine 1395, LDAP directory services and/or a reliable messaging interface. It should be appreciated that the component 1390, commonly referred to as the TCP/IP adapter, can represent communications components, which includes TCP/IP, UDP/IP, Multicast Ethernet protocols, including IPv4 and IPv6. Any of the devices 1325, 1330, 1340-1355 and 1365-1375 can utilize the integration component 1385 and the TCP/IP adapter 1390 to communicate with the message engine 1395, and to further communicate with the devices 1325, 1330, 1340-1355 and 1365-1375. This capability can be leveraged to mitigate any need for middleware and extra PC boxes and polling protocols, for example, as employed by conventional systems to facilitate such interaction. Communication between the devices 1325, 1330, 1340-1355 and 1365-1375 and the message engine 1395 can include, but is not limited to, serving up web based data (e.g., web pages, data views, XML, a web object, a CIP object . . . ), publishing information (e.g., messages, data, tags, status, state, error messages . . . ), subscribing to receive information, and/or polling for information. In addition, the communication can include downloading, launching, terminating, updating, pausing, monitoring and/or removing applications. Furthermore, suitable communication includes tunneling down to any of the 1325, 1330, 1340-1355 and 1365- 1375 devices In order to provide additional context, FIG. 13 and the following discussion is intended to provide a brief, general description of a suitable computing environment in conjunction with the controllers and/or UPM messaging structure, wherein the various aspects of the subject innovation may be implemented. While the subject innovation has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

Figure 14:
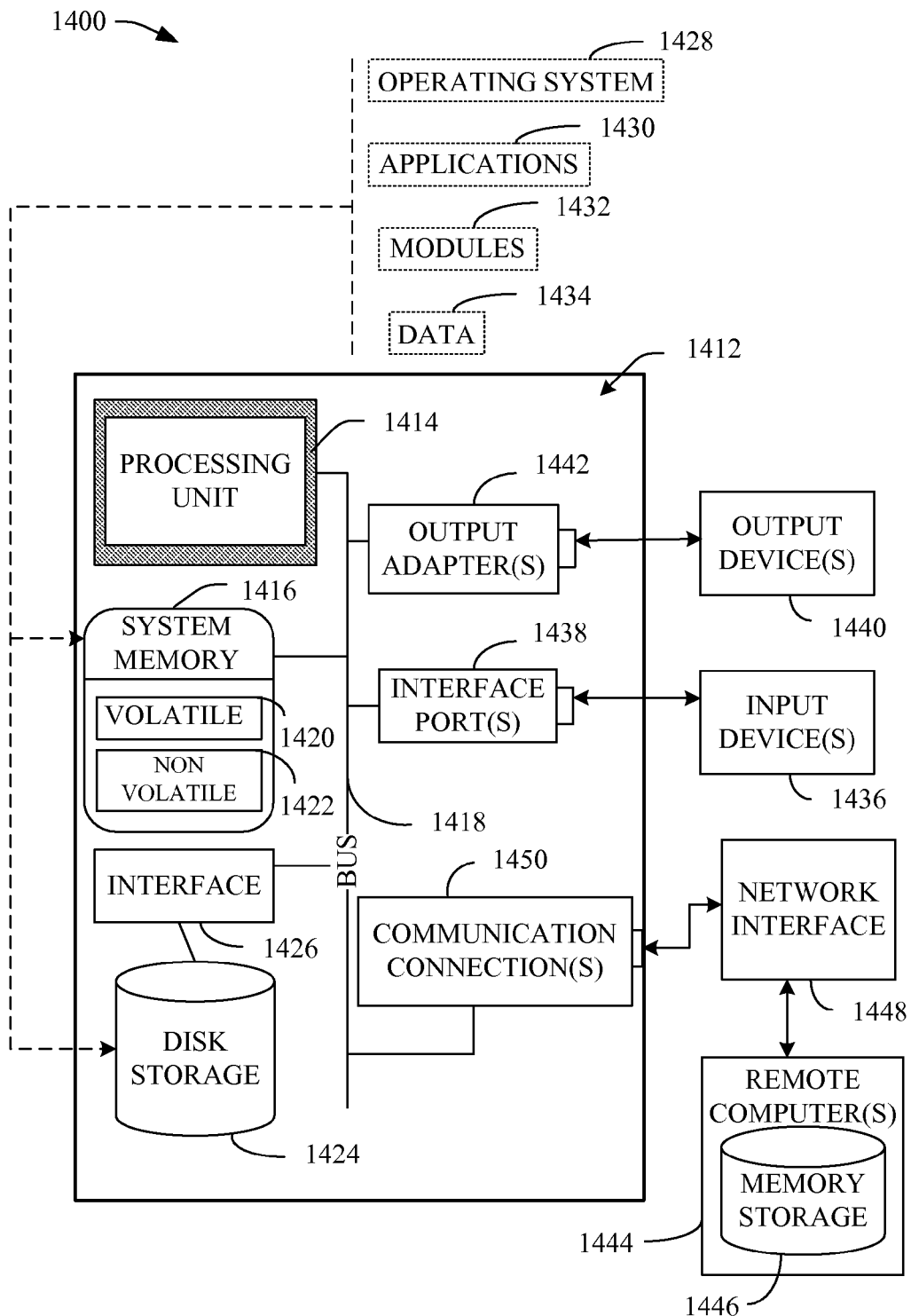
FIG. 14 provides a brief, general description of a suitable computing environment in conjunction with various aspects of the subject innovation.

With reference to FIG. 14, an exemplary environment 1400 for implementing various aspects of the claimed subject matter includes a computer 1412. The computer 1412 includes a processing unit 1414, a system memory 1416, and a system bus 1418. The system bus 1418 couples system components including, but not limited to, the system memory 1416 to the processing unit 1414. The processing unit 1414 can be any of various available processors. Dual microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable programmable ROM (EEPROM), or flash memory. Volatile memory 1420 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1412 also includes removable/non-removable, volatile/non-volatile computer storage media. FIG. 14 illustrates, for example a disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used such as interface 1426.

It is to be appreciated that FIG. 14 describes software that acts as an intermediary between users and the basic computer resources described in the suitable operating environment 1400. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that the claimed subject matter can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412, and to output information from computer 1412 to an output device 1440. Output adapter 1442 is provided to illustrate that there are some output devices 1440 like monitors, speakers, and printers, among other output devices 1440, which require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems and DSL modems, ISDN adapters, and Ethernet cards.

As used in this application, the terms "component," "handler," "model," "system," and the like are also intended to refer to a computer-related entity, either hardware, a combination of hardware and software, software, or software in execution, in addition to electro mechanical units. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). In a related aspect, in addition to an industrial setting having a limited number of units in a single site, the term "system" can also refer to manufacturing/information control settings that can encompass multiple sites in a global/distributed manufacturer.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A distributed message exchange system comprising:
   at least one processor;
   at least one memory communicatively coupled to the at least one processor, the at least one memory having stored therein computer-executable components, comprising:
      a unified plant model (UPM) comprising a UPM message protocol, wherein the UPM messaging protocol comprises:
         a user process, controller program or system stack,
         a message library functions and controller instructions stack,
         a messaging services protocol interface stack,
         a communications protocol stack,
         a message protocol stack,
         a network stack,
         a network protocol stack, and
         a physical layer stack;
      a plurality of message engines with linkage therebetween, the plurality of message engines configured to normalize messages of various communication protocols and message formats according to the UPM, wherein the plurality of message engines are further configured to transmit the messages independent of an availability of at least one of a sender or a recipient of the messages.

2. The distributed message exchange system of claim 1 further comprising a directory configured to provide a logical view of the UPM.

3. The distributed message exchange system of claim 2, the logical view further comprising physical location of data subscriber.

4. The distributed message exchange system of claim 3 further comprising a view configured to provide a common perspective to proprietary and third party legacy information.

5. The distributed message exchange system of claim 1, the message library functions and the controller instructions stack comprises library components configured to facilitate type conversions and a message exchange between the plurality of message engines.

6. The distributed message exchange system of claim 5, the library components comprise logical definitions of messages.

7. The distributed message exchange system of claim 5 further comprising scenario definitions that are built from library components.

8. The distributed message exchange system of claim 5 further comprising application solutions that are deployable to the UPM and bound to physical devices.

9. The distributed message exchange system of claim 1, the plurality of message engines further configured to support self describing messages.

10. The distributed message exchange system of claim 1, the plurality of message engines further comprising a registration component configured to register applications with the plurality of message engine.

11. The distributed message exchange system of claim 1, the plurality of message engines deployable based on quality of service metrics from an administration environment.

12. The distributed message exchange system of claim 1, the plurality of message engines configurable to send messages based upon quality of service levels, the quality of service levels comprising at least one of send once with no guarantee of delivery, send with guaranteed delivery, or send once with guarantee of delivery.

13. The distributed message exchange system of claim 1, the plurality of message engines configurable to send messages based upon a qualification, wherein the qualification is at least one of send messages with a minimum time delay between transmissions, group multiple messages together in a batch, delete unhandled message after a specified elapsed time, or forward message to another queue after a specified elapsed time.

14. The distributed message exchange system of claim 1 further comprising a library configured to contain data for representation of industrial operations.

15. The distributed message exchange system of claim 1, the plurality of message engines comprise an application interface configured to provide common access points between applications.

16. The distributed message exchange system of claim 1 further comprising a management interface that is common to an integrator component and a historian that form part of the unified plant model.

17. The distributed message exchange system of claim 1, wherein the recipient is at least one of an industrial controller, a robot, a state machine, a subscriber to the message engine, a database, a server, a client, an integration server, a business system, a business application, an Enterprise Resource Planning (ERP), a Manufacturing Execution System (MES), or a Machine Control (MC) system.

18. The distributed message exchange system of claim 1, wherein at least one of the plurality of message engines is located in an industrial controller.

19. The distributed message exchange system of claim 1 further comprising a security mechanism configured to authorize message posting to the message engine and message retrieval from the message engine.

20. A method of message exchange within an industrial plant comprising:
   supplying a linkage among a plurality of message engines within a unified plant model (UPM), the message engines having messaging protocols, comprising:
      a user process, controller program or system stack, a message library functions and controller instructions stack,
a messaging services protocol interface stack,
a communications protocol stack,
a message protocol stack,
a network stack;
a network protocol stack, and
a physical layer stack;
receiving a message by a messaging engine of the plurality of message engines;
normalizing the message by the messaging engine;
determining appropriate mapping for routing the message; and
transmitting the message by a messaging engine of the plurality of message engines independent of an availability of at least one of a sender or a recipient of the message.

21. The method of claim 20 further comprising supplying real time exchange of messaging among modules and applications.

22. The method of claim 20 further comprising sending the message based upon quality of service levels comprising at least one of sending once with no guarantee of delivery, sending with guaranteed delivery, or sending once with guarantee of delivery.

23. The method of claim 20 further comprising sending the message based upon a qualification comprising at least one of sending messages with a minimum time delay between transmissions, grouping multiple messages together in a batch, deleting an unhandled message after a specified elapsed time, or forwarding the message to another queue after a specified elapsed time.

24. The method of claim 20 further comprising referencing message definitions in libraries.

25. The method of claim 20 further comprising building libraries that represent industrial operations for the industrial plant.

26. The method of claim 20 further comprising managing exchanged messages consistently across the industrial plant.

27. The method of claim 20, further comprising accumulating attributes related to a message during transmission in a network.

28. The method of claim 20 further comprising supplying support for a plurality of message channels at different logical and physical levels.

29. A non-transitory computer readable medium comprising:
    instructions for supplying a linkage among a plurality of message engines within a unified plant model (UPM), wherein the UPM comprises a messaging protocol comprising:
        a user process, controller program or system stack,
        a message library functions and controller instructions stack,
        a messaging services protocol interface stack,
        a communications protocol stack,
        a message protocol stack,
        a network stack,
        a network protocol stack, and
        a physical layer stack;
    instructions for receiving a message by a messaging engine of the plurality of message engines;
    instructions for normalizing the message by the messaging engine;
    instructions for determining appropriate mapping for routing the message; and
    instructions for transmitting the message by the messaging engine of the plurality of message engines independent of an availability of at least one of a sender or a recipient of the message.

30. The non-transitory computer readable medium of claim 29 further comprising instructions for sending the message based upon a qualification, wherein the qualification is least one of send messages with a minimum time delay between transmissions, group multiple messages together in a batch, delete unhandled message after a specified elapsed time, or forward message to another queue after a specified elapsed time.

31. A system that facilitates reliable messaging within an industrial setting comprising:
    means for exchanging messages among a plurality of industrial units according to a unified plant model, wherein the means for exchanging operates independent of an availability of at least one of a sender or a recipient of the message), wherein the unified plant model comprises a messaging protocol comprising:
        a user process, controller program or system stack,
        a message library functions and controller instructions stack,
        a messaging services protocol interface stack,
        a communications protocol stack,
        a message protocol stack,
        a network stack,
        a network protocol stack, and
        a physical layer stack;
    means for normalizing messaging of various protocols and formats within the means for exchanging messages, and
    means for mapping the unified plant model to the means for normalizing.

* * * * *